Nov. 12, 1940.  H. EPSTEIN  2,220,895

GLOW DISCHARGE DEVICE

Filed June 5, 1936

Inventor
Hirsch Epstein
By Morris Spector,
Attorney

Patented Nov. 12, 1940

2,220,895

UNITED STATES PATENT OFFICE 2,220,895

GLOW DISCHARGE DEVICE

Hirsch Epstein, Chicago, Ill.

Application June 5, 1936, Serial No. 83,746

6 Claims. (Cl. 176—122)

This invention relates to electric illumination, and more particularly to glow discharge signs, especially to such signs as are known as "neon" signs, although not limited to glow discharge signs. The invention also relates to the glass tubing or the like for use on such signs.

I have found that colored glass, or fluorescent glass, when used in connection with a glow discharge sign deteriorates rapidly. In using white fluorescent glass tubing for glow discharge devices I have found that the glass reacts chemically with the mercury vapors that are used for obtaining white light, soon causing darkened areas in the glass thereby reducing the efficiency and detracting from the appearance of the sign. I have also found that when such glass is allowed to weather in the atmosphere the glass decomposes, or disintegrates, it changes color and gets rough. This detracts from the appearance of the glass and renders cleaning thereof difficult. It is possible that such changes are due to the chemical, or physical, reaction of the glass with particles of metal and impurities which are sputtered off from the electrodes and react with the glass.

It is one of the objects of the present invention to eliminate the aforementioned difficulties and to provide a colored, or fluorescent, glass tubing or glow discharge device which will not deteriorate, and which will not react with the materials sputtered and given off from the electrodes. I accomplish the above results by providing the fluorescent, or colored, glass tubing with an inner layer of colorless glass. This inner layer does not affect the light transmitting properties of the tube, and it does protect the colored, or fluorescent glass from the deteriorating elements. Also, I have found that the pumping operation for evacuating such tubing is appreciably simplified because the colorless glass is not affected by contamination from the electrodes to anywhere near the degree to which the colored glass is affected.

I have also found that colored glass for fluorescent glass used in glow discharge devices deteriorates due to the action of the sun, or of the elements of the atmosphere. I propose to overcome this difficulty by protecting the colored or fluorescent glass by providing an outer protective coating of colorless glass. In other words, my glass tubing comprises a layer of colored, or fluorescent glass, and an inner or outer layer of clear glass, or both inner and outer layers of clear glass.

Colored glass is by far more expensive than colorless or clear glass. By constructing the tubing of layers of clear and colored, or fluorescent glass I reduce the cost of the tubing because I thereby reduce the amount of colored, or fluorescent glass that is used.

The glass tubing used for glow discharge devices must have a substantial thickness in order to afford the necessary strength. When a colored glass tube is made of the requisite thickness a great deal of the light is absorbed. This difficulty can be overcome by making the colored portion of the tube exceedingly thin and building up the necessary thickness, for strength, by means of colorless glass. By using a thin layer of colored glass of proper pigment intensity such a tube will appear bright in color when viewed by outside light with no illumination inside the tube. Very little light is absorbed by the colored glass when this tube is illuminated from within.

It is a further object of the present invention to provide glass tubing for glow discharge devices, which tubing is so constructed that different portions of the section of the tubing are of different color intensity. If it is desired to cut off a substantial amount of the light at the back then the colored glass at the back portion of the glass tube may be made of a substantial thickness, while the front portion has a very thin colored layer. Also, the front colored layer may be of a different color than the back colored layer.

I have found that colored glass tubing, when heated during the bombarding process of making glow discharge devices, is not as good an electric insulator as colorless glass tubing. By constructing the tubing in laminated form, as above pointed out, so that a part of the glass is colorless, the entire unit has much better electrical insulating properties when heated than if the entire tube were of colored glass.

The clear glass on the outside increases the dielectric strength of the tube and facilitates electrical bombardment during pumping at high voltages, especially where the tube is bent so that opposite ends are close together.

It is a further object of the present invention to provide a glass tubing comprising a plurality of layers of different colored glass so that undesired colors of light may be filtered out. For instance, when the gas mixture used produces a blue light, or glow, and the glass is a white fluorescent glass, a bluish white light is produced. If a layer of yellowish straw colored glass is placed over the white fluorescent glass then the resulting light emitted from the tube is of a light green color. If the white fluorescent glass is overlaid by amber glass, then a gold colored light is produced. With neon gas in a red glass tube overlaid by a layer of light green glass a gold light is produced. By having two or more layers of different colored glass a much better lighting effect is produced from what can be produced by having single colored glass. In order to protect the inner layer of colored, or fluorescent, glass from deterioration, a layer of colorless glass can be put inside, and a like layer on the outside.

It has been proposed, heretofore, to use black glass tubing for joining together the colorless portions of the sign so that the black tubing occupies those portions of the sign where it is desired to have no illumination. For instance, in joining two letters of a word it has been proposed to use black glass rather than colorless glass painted over. Experience has shown that it is exceedingly difficult to provide a good permanent joint between black glass and colorless glass, and that faults frequently develop at the joint. I propose to overcome this difficulty by providing black tubing wherein the layer of black glass is but a small fraction of the total thickness of the tubing, the rest of the tube being colorless glass. The colorless glass portion of the black tubing can readily be joined to the adjacent colorless glass tubing to produce a good joint.

The attainment of the above and further objects of the present invention will be apparent from the following specification taken in conjunction with the accompanying drawing forming a part thereof.

Figure 6:
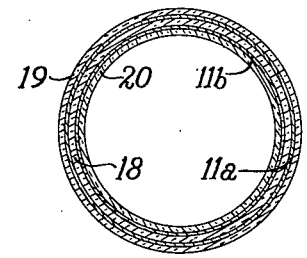
Figure 7:
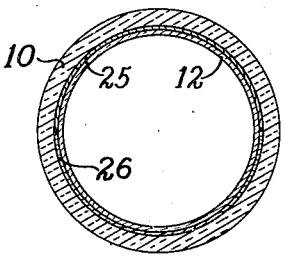
Figure 8:
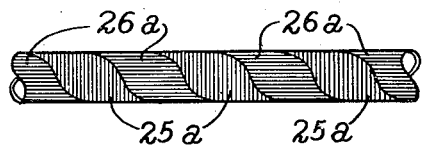

Figures 3 to 7, inclusive, are enlarged cross sectional views through tubing of different constructions embodying the principle of the present invention; and Figure 8 is a fragmentary longitudinal view of a form of glass tube of a glow discharge sign wherein the coloring is arranged spirally.

Similar reference numerals indicate similar parts in the various figures.

Figure 1:
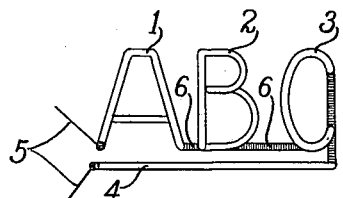
Figure 1 is a front view of a portion of a representative glow discharge sign constructed in accordance with my invention.

Reference may now be had more particularly to Figure 1. I have there shown a number of letters of a glow discharge sign. This is merely illustrative and comprises three letters of the alphabet indicated at 1, 2 and 3, and a decorative portion indicated at 4. This glow discharge sign may be one commonly known as "neon" signs and comprises glass tubing of substantially uniform thickness bent to the proper configuration, and filled with a suitable gas, or gases, at the desired pressure. While neon gas is most commonly used, such signs are not limited to the use of neon gas since there are many other gases, or combinations of gases, which may be used, as is well known in the art. Suitable electrical connections 5 terminating in electrodes within the tube are provided for passing an electric current through the gases within the tube for producing a luminous glow, which appears as a pencil of light extending lengthwise in the tube. This is all well known in the art and no further description thereof is deemed necessary at this time.

My glow discharge sign employs a type of glass which produces certain new results in a glow discharge sign. The glass of which the letters indicated at 1, 2 and 3 is formed comprises colored glass tubing which may be of one, or of a plurality of colors. Also, the tubing of the three letters shown may be of the same color, or of different colors. The portion of tubing 6—6 that joins adjacent letters may be of a black color, that is, of a color which transmits little or no light through it. On the other hand, if desired, the tubing 6 may be of the kind which does transmit light through it quite readily, but of a color distinctly different from the colors of the letters being joined thereby. The decorative portion 4 may be glass of still another color.

Figure 2:
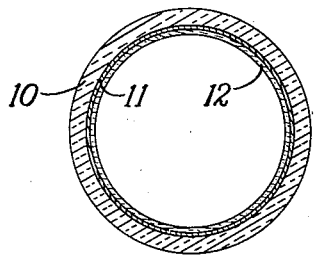
Figure 2 is an enlarged cross sectional view through the tubing of the sign of Figure 1.

In Figure 2 there is shown an enlarged cross section of a representative glass tubing of which the sign shown in Figure 1 is made. The tube is circular in cross section and comprises an outer layer 10 of clear glass, an intermediate layer 11 of colored glass, and an inner layer 12 of clear glass. The three layers of glass are united together to form one integral body. In one tube which I have constructed the diameter was ⅜ of an inch and the total thickness of the three layers was approximately one millimeter, or 1/25 of an inch. The layer 11 constituted approximately ⅛ of the total thickness, or was of a thickness of approximately 1/150 of an inch. The layer 10 of clear glass was about three or four times the thickness of the layer 12. These dimensions are, of course, merely illustrative, as they may be departed from within very wide limits. The colored glass 11 may be of the same distinctive color as the characteristic color of the glow emitted by the particular gas or gases within the tube. In the neon sign this would be red. On the other hand, if desired, the glass 11 may be of a color distinctly different from the characteristic color of the glow emitted by the gas within the tube. The colored glass portion 11 is so thin that it absorbs very little of the light of the glow discharge, yet when the sign is not operating, and is viewed by reflected light (daylight or the like), the colored glass tubing is distinctly visible. The thickness of the colored glass portion 11 is determined by the intensity, or deepness, of the color desired, and the amount of light that is to be, or may be, absorbed. By making the colored glass in the form of a thin layer of densely colored glass very little of the light of the glow discharge is absorbed, and yet the desired color effect is obtained. Where it is desired to produce appreciable light absorption or forward reflection, a denser or thicker, layer of colored glass may be used.

By putting a layer of colorless glass over the layer 11 of colored glass the colored glass is protected from outside conditions, such as weather, dirt, ultra violet light from the sun, etc. By using a layer of colorless glass on the inside of the colored layer 11 the colored layer is protected from contamination or deterioration resulting from the gas, chemicals, and particles of metal that are sputtered off from the electrodes or are present in the tube.

If desired, the glass 11 may be white glass, or red glass, or straw colored glass, all of the type which transmit light. On the other hand, the colored glass 11 may be opaque glass, either black or any other color. Opaque glass is desirable at the points 6—6 of Figure 1. I am aware that it has been suggested, heretofore, to use opaque glass, such as black glass, between adjacent letters of a glow discharge sign. The glass heretofore suggested for this purpose was opaque throughout. It is very difficult to make good and permanent joints between such opaque glass and the glass used for the display portions. By using glass of my present invention this difficulty is eliminated because by far the largest proportion of the glass at the joint between adjacent pieces is clear colorless glass of the type which can be joined with facility. In the case of black glass the overlaying layer may be any soft glass with which a joint can be made with facility, regardless of the presence or absence of color in said layer.

Figure 3:
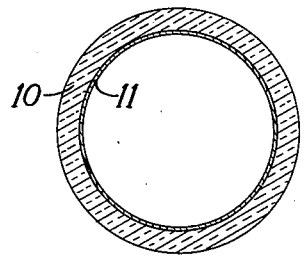

In Figure 3 I have shown a section of a glass tubing corresponding to Figure 2 but different therefrom essentially in that here the glass consists only of two laminae, namely the outer layer 10 and the inner colored layer 11, which inner layer is not overlaid by a layer corresponding to the layer 12 of Figure 2. The outer clear glass layer 10 affords the necessary strength and provides clear glass for making the joints, whereas the exceedingly thin layer of colored glass 11 imparts the necessary color to the sign. The layer of clear glass 10 also protects the sign from sun light, as well as from the deteriorating elements of the atmosphere.

Figure 4:
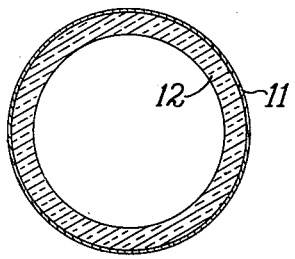

In Figure 4 I have shown a section of a colored glass tubing consisting of two layers as in Figure 3, but differing from Figure 3 in that here the colored glass 11 is on the outside and the colorless glass 12 for providing the necessary thickness, etc., for the tubing is on the inside. The glass 12 protects the colored glass 11 from the deteriorating action of the glass within the tube, and electrical bombardment.

Figure 5:
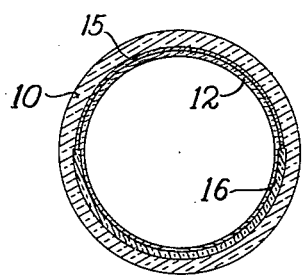

In Figure 5 I have shown a cross section of a glass tubing so constructed that a substantial amount of the light of the glow discharge is cut off at the back of the glass and reflected forward. This tube comprises inner and outer layers of clear colorless glass, indicated at 10 and at 12, and a layer of colored glass which is quite thin at the front portion of the tube, as indicated at 15, and of greater thickness at the rear portion of the tube, as indicated at 16. The colored glass portion 15 is of a thickness of the colored glass portion 11 of Figure 2, whereas the colored glass portion 16 is of appreciably greater thickness, or of appreciably greater density. The back portion 16 acts as a reflector for the light of the glow discharge. I have found that by making the colored portion 16 of somewhat greater thickness than the portion 15 it can reflect forward a large proportion of the light of the discharge that strikes it, so that the total light emitted by the tube, forward thereof, is increased as much as 80% compared with what is emitted at the front of a glow discharge tube without the thickened backing 16.

In Figure 6 I have illustrated a cross section of another glass tubing for glow discharge sign. This glass tubing comprises two layers of colored glass 11a and 11b, separated by a layer of clear glass 18, and protected on the outside by a layer of clear glass 19 and on the inside by a layer of clear glass 20. If desired the layer 18 of clear glass may be omitted. Also, either one of the clear glass layers 19 or 20 may be omitted, as illustrated in Figures 3 and 4. The colored glass layers 11a and 11b are of different colors or kinds of glass. For instance, the layer 11b may be of white fluorescent glass and the layer 11a of yellowish straw colored glass. When a rare gas mixture giving a blue light is used inside of this tubing a light green light is emitted from the tubing. If the layer 11a is made of amber colored glass, the light emitted under the above mentioned circumstances will be a gold color.

I have found that it is not practical to produce certain colors of resulting light from one colored glass. By having two or more layers of different colored glasses a much better result can be obtained. Where the colored glasses are of the kind that should not be mixed they may be separated by a layer of clear colorless glass, otherwise the intermediate layer 18 of colorless glass may be omitted. The layer 18 may also be a colored glass that does not react chemically with layer 11a and 11b and does not change the resultant color appreciably.

By using neon gas in a red glass tube overlaid with a layer of light green glass a gold light is produced. Any number of light combinations may thus be obtained.

In Figure 7 I have shown a section of a glass tubing, for neon signs, where different colored effects are produced by having successive arcuate portions of the tube of different colors. In this construction the inner and outer layers 10 and 12 are of clear colorless glass and of the intermediate layer one half, indicated at 25, is glass of one color and the other half 26 is glass of another color. The layers 25—26 may be of the same thickness, namely as indicated at 11 in Figure 2, or may be of different thickness, namely as indicated at 15 and 16 of Figure 5. Also, if desired, the layers 11a and 11b of Figure 6 may each comprise a plurality of different colors as indicated at 11a and 11b of Figure 6, and each layer may extend through an arc other than 180°.

With glass tubing of the character illustrated in Figure 7, a spiral effect may be obtained by twisting the heated tube. In such a construction certain desirable effects may be produced by mounting the tubing for rotation. In this construction the glasses of different colors are indicated at 25a and 26a.

While I have here spoken of glass of different colors, I include in the category of colored glass flourescent glass tubing, which may be white, or of other colors. Such fluorescent glass tubing is well known. Such tubing may be obtained either as opaque glass, or as glass which transmits most of the light emitted by a glow discharge device within the tube. When the tubing is opaque it may be used in the manner illustrated in Figure 5. The back, or other portion, may be of opaque glass and other portions transparent or translucent.

The term "colored glass" as used in this specification includes all kinds of glass which is not colorless, including such glasses as white, uranium, opal, opalescent, irridescent glass, various colors of fluorescent glass, etc.

The layers of colored glass illustrated at 11, 12, 16, 25 and 26 may be layers of light pervious pigment interposed between inner and outer layers of clear glass.

The term "glass" has been here used in its broadest aspect and is intended to cover all substances capable of being worked to produce a glass-like rigid tube.

While I have here illustrated the invention as applied to a glow discharge device, it is apparent that the glass of the present invention may be applied to other types of electric lights, for example, filament type lights, or lights employing an arc, etc.

In compliance with the requirements of the patent statutes I have here shown and described a few preferred embodiments of my invention. It is, however, to be understood that the invention is not limited to the precise constructions here shown, the same being merely illustrative of the principles of the invention. What I consider new and desire to secure by Letters Patent is:

1. A glow discharge device comprising a glass tube containing a conducting gaseous atmosphere and having means for passing an electric current therethrough, characterized in that the rear side of the glass tube is colored and the front side is of the same color as the rear side but of different intensity of color.

2. A glass tube characterized in that the rear side of the glass tube is colored and of a color visible from the front side, and the front side is of the same color as the rear side but of different intensity of color.

3. An electric light comprising a glass tube of substantially uniform thickness of glass throughout its cross section characterized by the fact that the front and rear sides of the tube are colored and of the same color but of different intensity of color.

4. A tube comprising concentric layers of light-pervious glass and glass which is substantially totally impervious to light.

5. A tube comprising concentric layers of light-pervious glass and opaque glass which is substantially impervious to light, with the opaque glass extending substantially 360° around the tube, the light-impervious glass being appreciably thicker than the opaque glass.

6. A glow discharge device comprising a length of light-pervious glass tubing joined by a length of opaque glass tubing the length of opaque glass tubing comprising a layer of opaque glass and a layer of light-pervious glass which is substantially totally impervious to light, whereby the light-pervious layer of the opaque length facilitates the joining of that length with the adjacent length.

HIRSCH EPSTEIN.

CERTIFICATE OF CORRECTION.

Patent No. 2,220,895.　　　　　　　　　　　　　　November 12, 1940.

HIRSCH EPSTEIN.

It is hereby certified that error appears in the printed specification of the above numbered patent requiring correction as follows: Page 4, second column, line 10, claim 5, for "light-impervious" read --light-pervious--; line 12, beginning with "6. A glow discharge" strike out all to and including the word and period "length." in line 19, and insert instead the following -

> 6. A glow discharge device comprising a length of light-pervious glass tubing joined by a length of opaque glass tubing the length of opaque glass tubing comprising a layer of opaque glass which is substantially totally impervious to light and a layer of light-pervious glass, whereby the light-pervious layer of the opaque length facilitates the joining of that length with the adjacent length.

and that the said Letters Patent should be read with this correction therein that the same may conform to the record of the case in the Patent Office.

Signed and sealed this 24th day of December, A. D. 1940.

(Seal)　　　　　　　　　　　　　　　　　　　　　　　Henry Van Arsdale,
　　　　　　　　　　　　　　　　　　　　　　　Acting Commissioner of Patents.